(12) United States Patent
Gotti

(10) Patent No.: US 12,214,531 B2
(45) Date of Patent: Feb. 4, 2025

(54) MOLD FOR THE MANUFACTURE OF SPORTING HELMETS AND RELATIVE PROCESS FOR MOLDING SUCH SPORTING HELMETS

(71) Applicant: KASK S.P.A., Chiuduno (IT)

(72) Inventor: Angelo Gotti, Nembro (IT)

(73) Assignee: KASK S.P.A., Chiuduno (IT)

( * ) Notice: Subject to any disclaimer, the term of this patent is extended or adjusted under 35 U.S.C. 154(b) by 203 days.

(21) Appl. No.: 17/645,332

(22) Filed: Dec. 21, 2021

(65) Prior Publication Data

US 2022/0203588 A1    Jun. 30, 2022

(30) Foreign Application Priority Data

Dec. 31, 2020 (IT) .................. 102020000032948

(51) Int. Cl.
| | |
|---|---|
| *B29C 45/26* | (2006.01) |
| *A42C 2/00* | (2006.01) |
| *B29C 45/14* | (2006.01) |
| *B29C 45/64* | (2006.01) |
| *B29K 25/00* | (2006.01) |

(Continued)

(52) U.S. Cl.
CPC .......... *B29C 45/2602* (2013.01); *A42C 2/002* (2013.01); *B29C 45/14008* (2013.01); *B29C 45/14065* (2013.01); *B29C 45/64* (2013.01); *B29K 2025/06* (2013.01); *B29L 2031/4821* (2013.01); *B29L 2031/52* (2013.01)

(58) Field of Classification Search
CPC ......... B29C 31/008; B29C 2045/14049; B29L 2031/4821; A42C 2/002
See application file for complete search history.

(56) References Cited

U.S. PATENT DOCUMENTS 1,639,312 A * 8/1927 Schrock ................ B29C 31/008
                                                               221/294
4,466,138 A * 8/1984 Gessalin ................. B29C 45/14
                                                                2/410

(Continued)

FOREIGN PATENT DOCUMENTS

EP          0317446 A1 *  5/1989  ....... B29C 45/14008
WO    WO 2020/021429 A1   1/2020

OTHER PUBLICATIONS

Italian Search Report issued Sep. 6, 2021 in Italian Application 102020000032948 filed on Dec. 31, 2020, 3 pages (with English Translation of Categories of Cited Documents).

*Primary Examiner* — Benjamin A Schiffman

(74) *Attorney, Agent, or Firm* — Oblon, McClelland, Maier & Neustadt, L.L.P.

(57) ABSTRACT

A mold and a relative molding process for the manufacture of sporting helmets, in particular cycling helmets. The mold includes a frame provided with at least one molding concavity; a counter frame engageable to the frame to hermetically close the respective molding concavity and allow the execution of at least one molding cycle. The mold further includes at least one intermediate support element for supporting and positioning one or more components of the sporting helmet to be manufactured inside the respective molding concavity of the frame. The intermediate support element is kept inside the respective molding concavity during the entire molding cycle in order to keep the components of the sporting helmet to be manufactured in their assigned positions.

20 Claims, 12 Drawing Sheets

(51) Int. Cl.
    *B29L 31/48*        (2006.01)
    *B29L 31/52*        (2006.01)

(56)                References Cited

U.S. PATENT DOCUMENTS

| | | | | |
|---|---|---|---|---|
| 4,571,320 | A | * | 2/1986 | Walker .................... B29C 31/08 |
| | | | | 425/137 |
| 4,586,886 | A | | 5/1986 | Prischak et al. |
| 4,615,438 | A | * | 10/1986 | Rosenberg ............... A42B 3/06 |
| | | | | 206/223 |
| 5,119,516 | A | * | 6/1992 | Broersma ................ A42B 3/28 |
| | | | | 2/412 |
| 5,477,563 | A | | 12/1995 | Gentes et al. |
| 5,481,762 | A | | 1/1996 | Gentes et al. |
| 5,527,173 | A | * | 6/1996 | Miller .................... B29C 45/42 |
| | | | | 425/588 |
| 5,565,155 | A | * | 10/1996 | Cheng-Hung .......... B29C 33/56 |
| | | | | 264/46.5 |
| 5,598,588 | A | * | 2/1997 | Lee ........................ A42C 2/002 |
| | | | | 2/421 |
| 6,416,706 | B1 | * | 7/2002 | Fisher ............... B29C 45/14008 |
| | | | | 425/522 |
| 7,128,564 | B2 | * | 10/2006 | Di Simone ......... B29C 45/4225 |
| | | | | 425/444 |
| 7,698,750 | B2 | * | 4/2010 | Bullock ................ A42B 3/066 |
| | | | | 2/412 |
| 7,913,325 | B2 | * | 3/2011 | Bullock ................ A42B 3/066 |
| | | | | 2/412 |
| 8,544,118 | B2 | * | 10/2013 | Brine, III ............... A42B 3/145 |
| | | | | 2/418 |
| 2021/0138702 | A1 | | 5/2021 | Gotti |

\* cited by examiner

MOLD FOR THE MANUFACTURE OF SPORTING HELMETS AND RELATIVE PROCESS FOR MOLDING SUCH SPORTING HELMETS

BACKGROUND OF THE INVENTION

The present invention relates to a mold for the manufacture of sporting helmets, in particular cycling helmets.

The present invention also relates to a process for molding the aforementioned sporting helmets and, in particular, the relative cycling helmets.

DESCRIPTION OF THE RELATED ART

The present invention is directed to the sector of production of sporting helmets and, in particular, cycling helmets.

As is known, cycling helmets are manufactured using suitable molds, each being provided with a female half-mold and a male half-mold.

Each mold is provided with respective supply channels for the polystyrene to be injected for the formation of the helmet, as well as with a plurality of holes for supplying the steam necessary for carrying out the molding cycle.

During the molding cycle, the polystyrene, in the form of spheres, undergoes a process of softening and expansion inside the mold cavity so that it takes on the shape of the product to be manufactured, i.e. the base body of the helmet designed to absorb shocks.

Once the base body has been obtained, it is removed from the mold to allow an operator to assemble further components of the helmet, such as the upper shell, the lower ring or under shell and any other components that need to be joined to the base body.

The base body, together with the additional helmet components, is inserted back into the mold in order to be subjected to a second molding cycle aimed at definitively binding the additional components to the base body.

Once the second molding cycle has been completed, the helmet obtained is removed from the mold again in order to be subjected to the final finishing operations, application of the padding and quality control.

In an attempt to improve the above-described molding process by making it quicker and more precise with obvious improvements in terms of the quality of the products obtained, the Applicant has designed and developed a support template which allows the positioning of the additional components of the sporting helmets to be manufactured inside the relative molds according to predetermined positions which must be maintained during the molding cycle.

The use of the above mentioned support template allows one of the two molding steps of the traditional molding process to be eliminated, ensuring a high percentage of repeatability of the precise positioning of the additional components inside the molds.

The support template and the relative process for molding by means of such a support template are described in detail in Italian Patent No. 102018000007587.

Although the aforementioned support template and the relative molding process allow for a considerable improvement of the traditional molding technique for sporting helmets, the Applicant has found that they are not free of certain drawbacks and are improvable in several respects, mainly in relation to the overall production times and to the elimination or maximum reduction of imperfections in the obtained sporting helmets.

In particular, the Applicant has found that the molding process by means of a support template referred to in Italian patent no. 102018000007587 comprises an operating step which presents some criticalities that can be found both in relation to production times and in relation to some imperfections present on the sporting helmets obtained, as well as to the risk of damage to the molds.

The Applicant has in fact been able to note that after having positioned all the additional components on a support template according to the relative predetermined positions, this support template is first inserted into the relative female half-mold in order to position the additional supported components in the relative molding positions where they are locked by corresponding locking mechanisms, to be subsequently removed and thus allow the closing of the mold and the start of the relative molding cycle.

In addition to lengthening the molding times of each molding cycle with undesirable repercussions on overall production times, the step of removing the support template from the relative female half-mold can in some cases result in imperceptible displacements of one or more additional components from their corresponding pre-set positions. In the best of cases, this unexpected event can lead to the onset of minor defects in the obtained sporting helmets. In the worst cases, the displacement of an additional component can also result in the damage to a mold when the latter is closed to start the molding cycle.

BRIEF SUMMARY OF THE INVENTION

The main object of the present invention is to propose a mold for the manufacture of sporting helmets, in particular cycling helmets, and a relative molding process capable of solving the problems encountered in the prior art.

It is an object of the present invention to further speed up the process for molding sporting and cycling helmets in such a way as to further reduce the overall production times of such helmets.

It is also an object of the present invention to ensure that high quality sporting and cycling helmets are obtained.

It is also an object of the present invention to ensure the structural integrity of the molds for the manufacture of the above-mentioned sporting and cycling helmets.

The above specified and yet further purposes are substantially achieved by a mold for the manufacture of sporting helmets, in particular cycling helmets, and a relative process for molding such sporting helmets, as described and claimed in the following claims.

By way of example, the description of a preferred but not exclusive embodiment of a mold for the manufacture of sporting helmets, in particular cycling helmets, and of a relative process for molding such sporting and cycling helmets is now disclosed, in accordance with the present invention.

BRIEF DESCRIPTION OF THE SEVERAL VIEWS OF THE DRAWINGS

This description will be made hereafter with reference to the accompanying figures, provided for indicative and therefore non-limiting purposes only, wherein.

DETAILED DESCRIPTION OF THE INVENTION

With reference to the appended figures, three components of a mold for the manufacture of sporting helmets, in particular cycling helmets, in accordance with the present invention are shown separately or in pairs.

Figure 1:
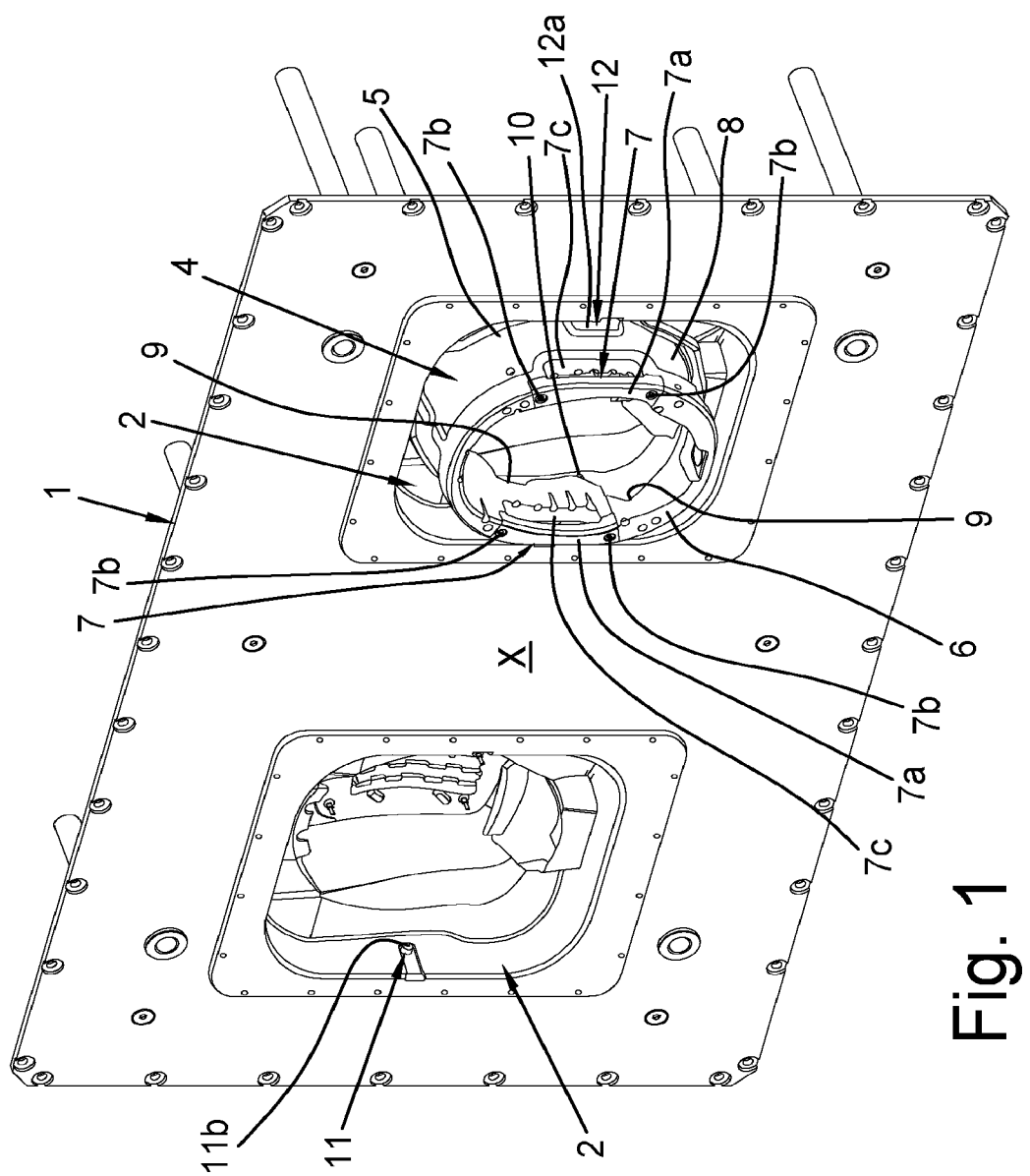
FIG. 1 is a perspective view of a frame of a mold for the manufacture of sporting helmets, in particular cycling helmets, in accordance with the present invention, provided with two molding concavities, one of which is occupied by a respective intermediate support element of the mold for supporting and positioning one or more components of the respective sporting helmet to be manufactured, and an empty molding concavity.
Figure 2:
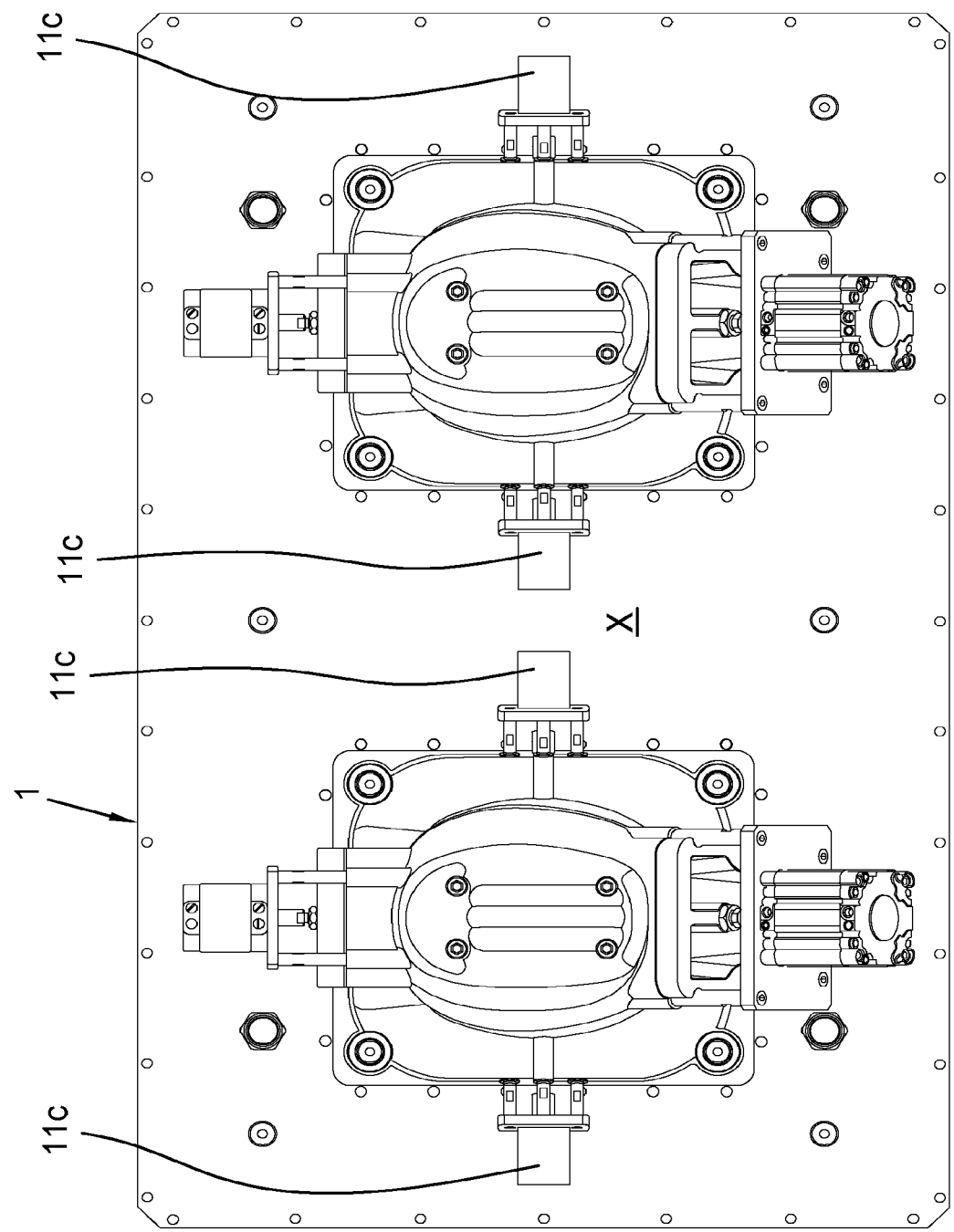
FIG. 2 is a rear view of the frame of the mold referred to in FIG. 1.
Figure 3:
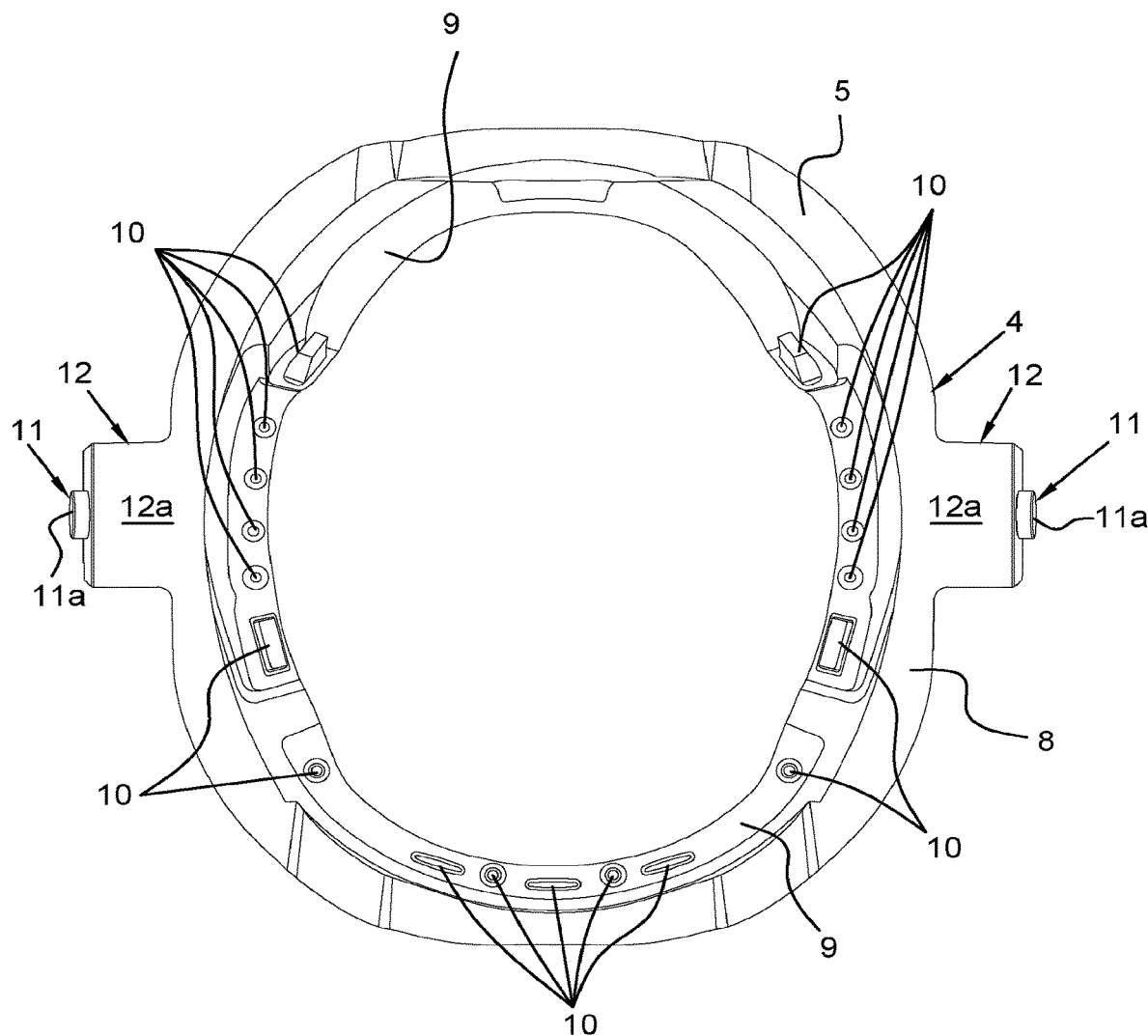
FIG. 3 is a front view of the intermediate support element referred to in FIG. 1.
Figure 4:
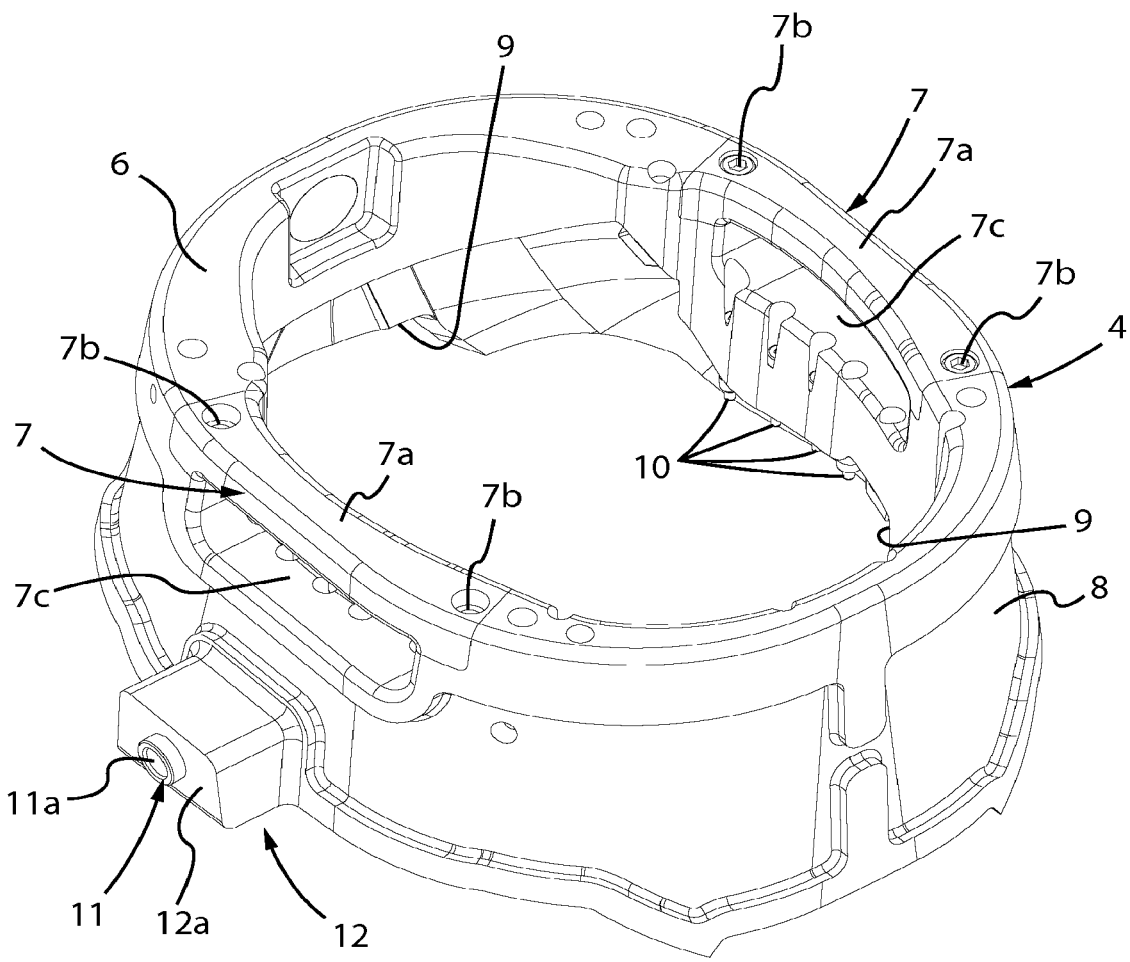
FIG. 4 is a rear perspective view of the intermediate support element referred to in FIGS. 1 and 3.
Figure 5:
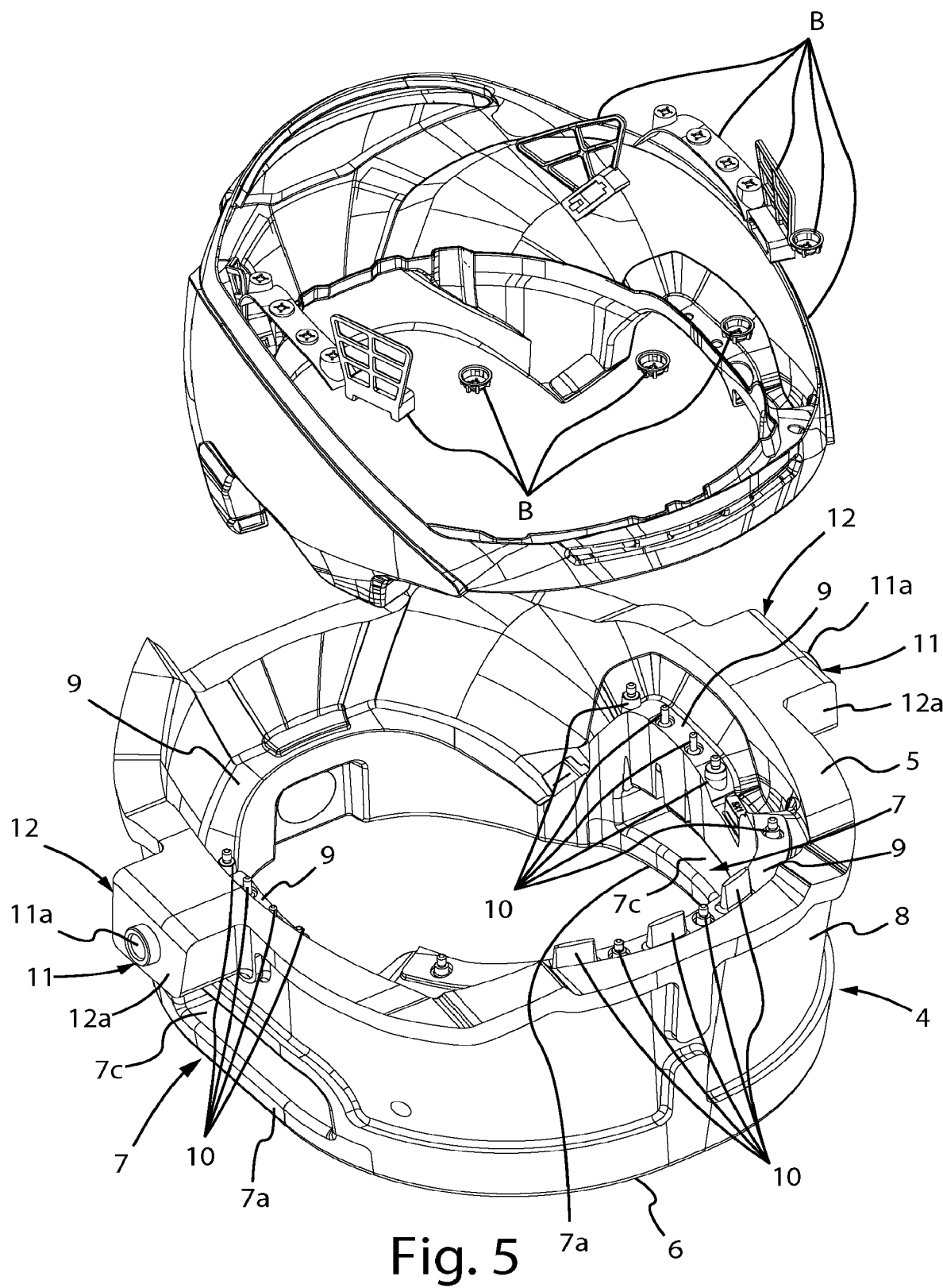
FIG. 5 is a front perspective view of the intermediate support element referred to in FIGS. 1, 3 and 4 shown in exploded view with some components of a sporting helmet to be manufactured.
Figure 6:
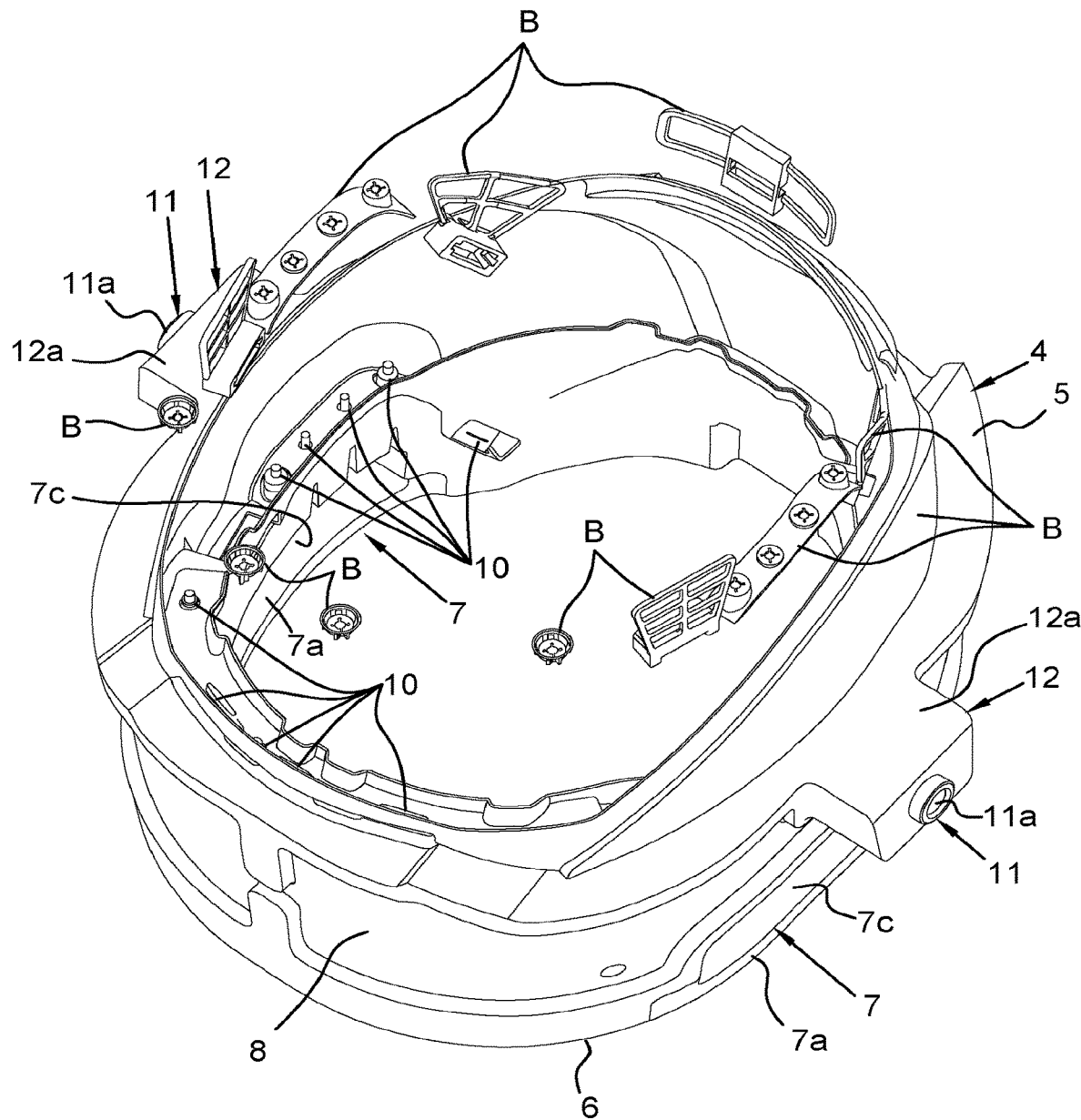
FIG. 6 is a front perspective view of the intermediate support element referred to in FIGS. 1 and 3 to 5, depicted with some components of the sporting helmet to be manufactured engaged in the corresponding predetermined positions of the intermediate support element and other components in the exploded view.
Figure 9:
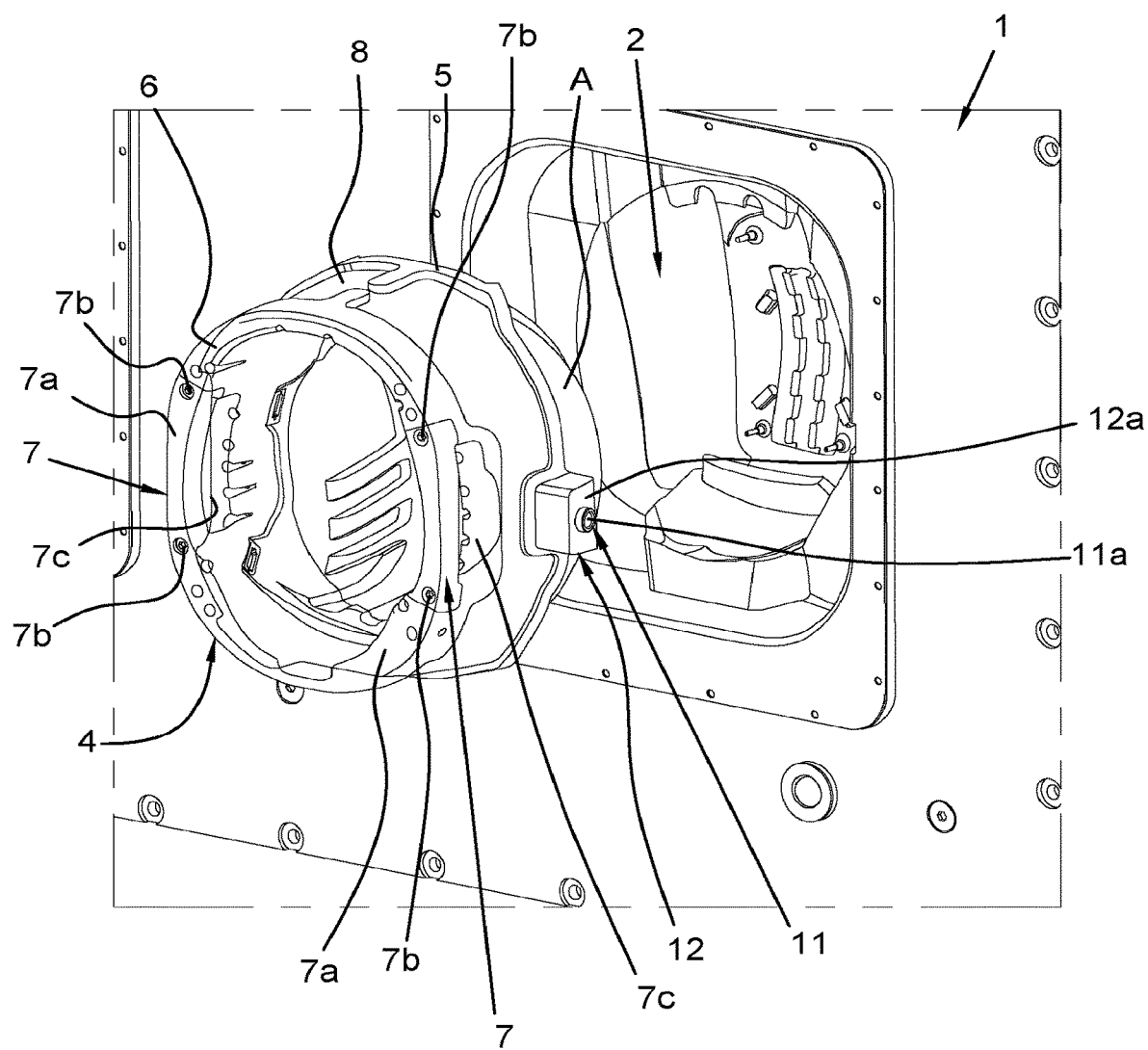
FIG. 9 is a schematic perspective representation of the removal of the intermediate support element referred to in FIGS. 1 and 3 to 8, provided with a respective sporting helmet obtained from a respective molding cycle, from a corresponding molding concavity of the mold frame referred to in FIGS. 1 and 2.
Figure 10:
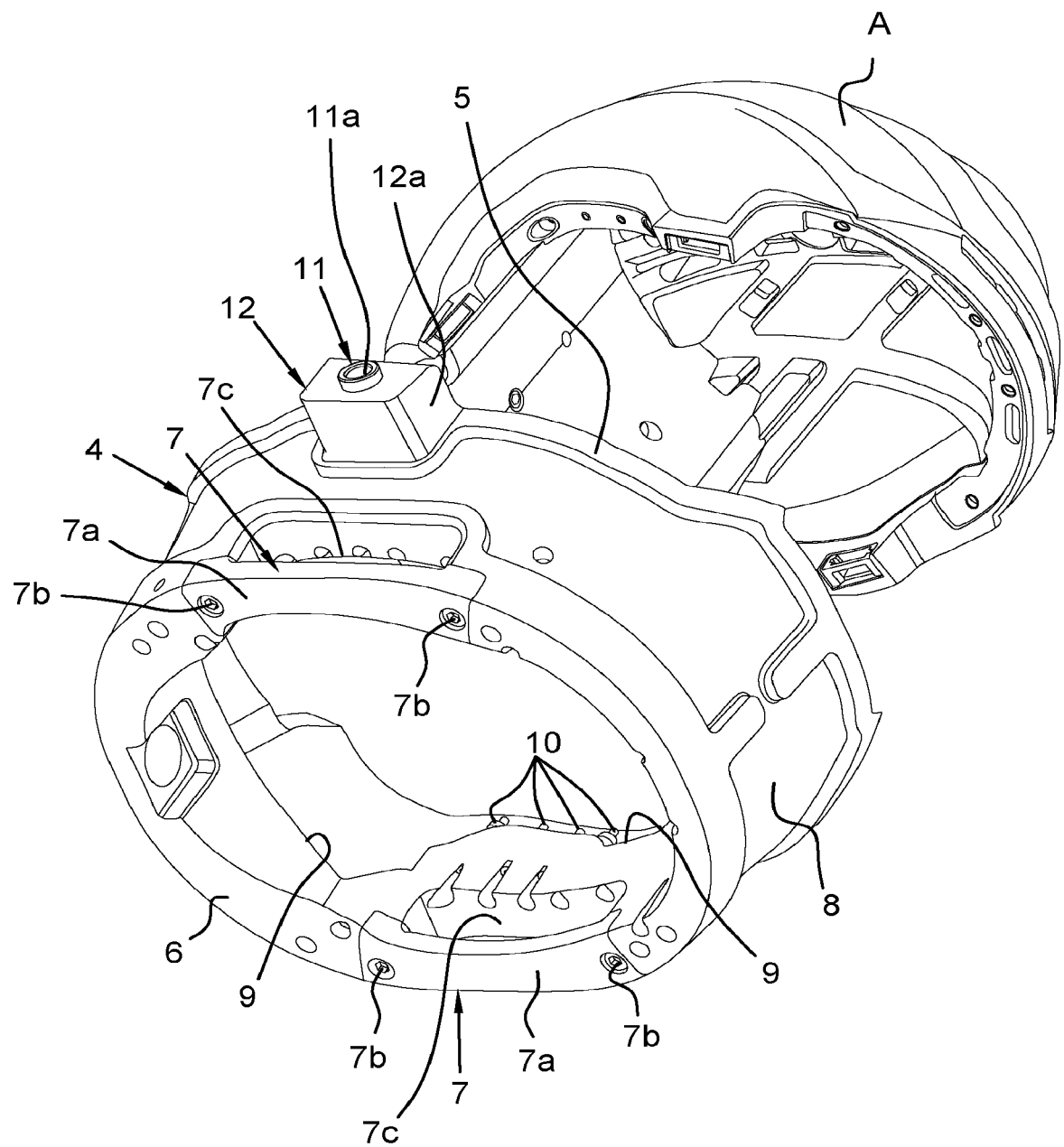
FIG. 10 is a schematic representation of the separation of the intermediate support element referred to in FIGS. 1 and 3 to 9 from the sporting helmet obtained from the respective molding cycle.

As visible in FIGS. 1 and 2, the mold comprises at least one frame 1 which defines at least or one molding concavity 2, preferably two or more molding concavities 2, for molding at least one respective sporting helmet A (FIGS. 9 and 10).

Advantageously, the presence of two or more molding concavities 2 per each mold allows the simultaneous manufacture of two or more sporting helmets A with a considerable increase in the number of sporting helmets A produced.

Figure 8:
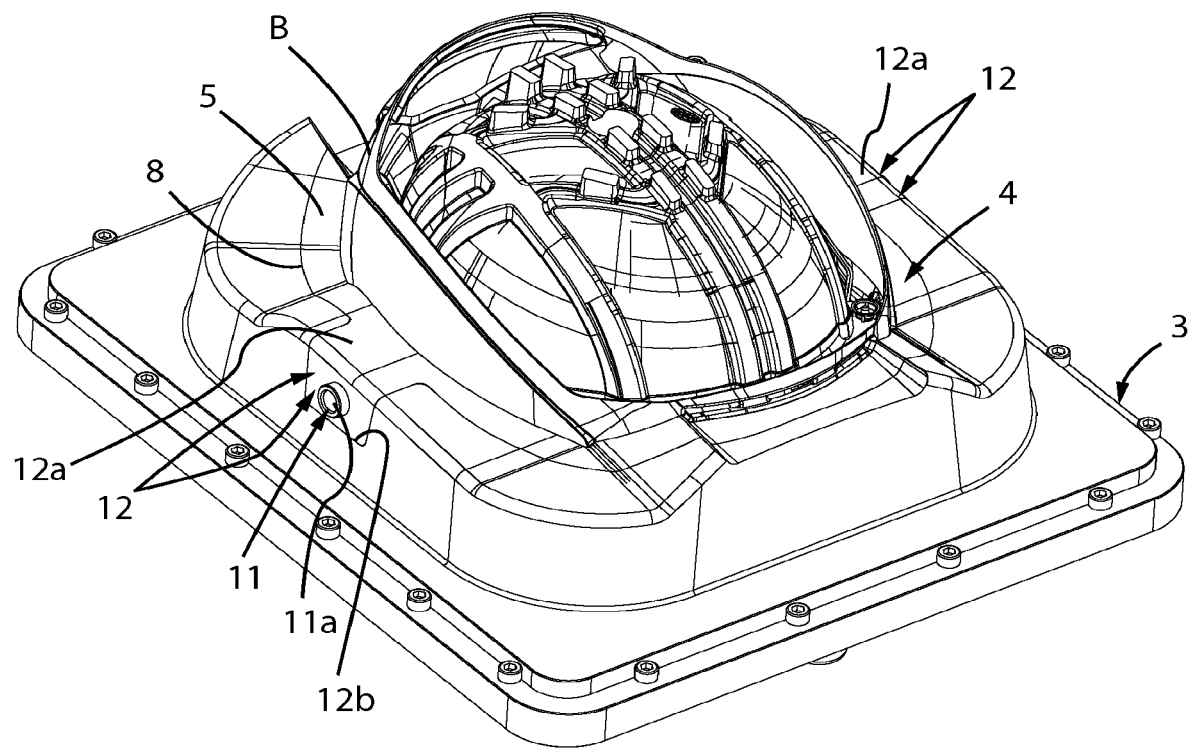
FIG. 8 is a front schematic perspective view of the intermediate support element referred to in FIGS. 1 and 3 to 7 provided with some components of the sporting helmet to be manufactured and coupled to a counter frame of the mold designed to close a corresponding molding concavity of the frame thereof referred to in FIGS. 1 and 2.

With reference to FIG. 8, the mold also comprises a counter frame 3 for each molding concavity 2 engageable to the frame 1 to hermetically close the respective molding concavity 2 and allow the execution of at least one molding cycle for the manufacture of a corresponding sporting helmet A.

With reference to FIGS. 1 and 3 to 10, the mold further comprises, for each molding concavity 2 provided in the frame 1, at least one intermediate support element 4 for supporting and positioning one or more components B, for example made of polycarbonate or another similar material, of the sporting helmet A to be made, inside the respective molding concavity 2 of the frame 1.

In detail, each intermediate support element 4 has a first portion 5 arranged to receive in engagement one or more components B of the sporting helmet A to be manufactured according to respective predetermined positions and a second portion 6, facing away from the first portion 5, having at least one grip handle 7, preferably two opposite grip handles 7, for manual positioning of the intermediate support element 4 in the respective molding concavity 2 of the frame 1 and the consequent positioning of the components B of the sporting helmet A to be manufactured inside said molding concavity 2.

As can be seen in FIG. 1, in order to allow an optimal closure of each molding concavity 2 of the mold frame 1 from the respective counter frame 3, each intermediate support element 4 is advantageously arranged to perfectly couple with the respective counter frame 3, in correspondence with the second portion 6. In this way, when each counter frame 3 hermetically closes the corresponding molding concavity 2 of the frame 1 of the mold, it also abuts against the respective intermediate support element 4 present inside said molding concavity 2 to maintain the components B of the sporting helmet A to be manufactured in the predetermined positions during the relative molding cycle.

As can be seen in FIGS. 1, 3 to 6 and 10, each intermediate support element 4 comprises a substantially annular structure 8 having internally at least one support seat 9 and/or a relief 10 of at least one component B of the sporting helmet A to be manufactured.

Again with reference to the figures in FIGS. 1, 3 to 6 and 10, the support seat 9 and/or the relief 10 are accessible from the first portion 5 of each intermediate support element 4, so that the positioning of the aforementioned components B of the sporting helmet A is carried out by keeping the first portion 5 of each intermediate support element 4 facing upwards or towards the Figure of the operator who is carrying out the action of positioning these components B of the sporting helmet A to be manufactured.

Preferably, the positioning of the components B of the sporting helmet A to be manufactured is performed by resting the second portion 6 of each intermediate support element 4 on a work plane or similar support plane in such a way that the first portion 5 of said intermediate support element 4 is easily reachable by the hands of the operator who has to position the components B of the sporting helmet A to be manufactured.

Again with reference to FIGS. 1, 4 to 7, 9 and 10, the aforementioned grip handles 7 are defined by the annular structure 8 of the respective intermediate support element 4.

In particular, each grip handle 7 comprises a gripping portion 7a designed to be manually gripped by an operator. The gripping portion 7a of each grip handle 7 is defined by a block engaged to the annular structure 8 of the respective intermediate support element 4, for example by means of corresponding threaded engagement elements 7b.

Each grip handle 7 further comprises at least one gripping opening 7c defined between the annular structure 8 of the respective intermediate support element 4 and the corresponding gripping portion 7a to allow insertion of the fingers of an operator's hand when he has to grasp the grip handle 7.

Advantageously, the mold comprises at least one engagement member 11 for the stable coupling of each intermediate support element 4 to the frame 1 inside the respective molding concavity 2.

In particular, the engagement member 11 is operatively interposed between each intermediate support member 4 and the respective molding concavity 2 of the frame 1.

More and more particularly, the engagement member 11 comprises at least one locking seat 11a (FIGS. 3 to 12), preferably two opposite locking seats 11a, realized outside the annular structure 8 of each intermediate support element 4.

The engagement member 11 further comprises at least one locking protuberance 11b (FIGS. 1, 11 and 12), preferably two opposite locking protuberances 11b, for each molding concavity 2 of the frame 1. Each pair of locking protuberances 2 of each molding concavity 2 is movable within the respective molding concavity 2 of the frame 1 between a rest position (FIGS. 1 and 11) wherein the respective intermediate support element 4 can be inserted into the corresponding molding concavity 2 or removed therefrom and a locking position (FIG. 12) wherein said locking protuberances 11b engage the respective locking seats 11a of the respective intermediate support element 4, holding the latter inside the respective concavity molding 2 of frame 1.

Figure 11:
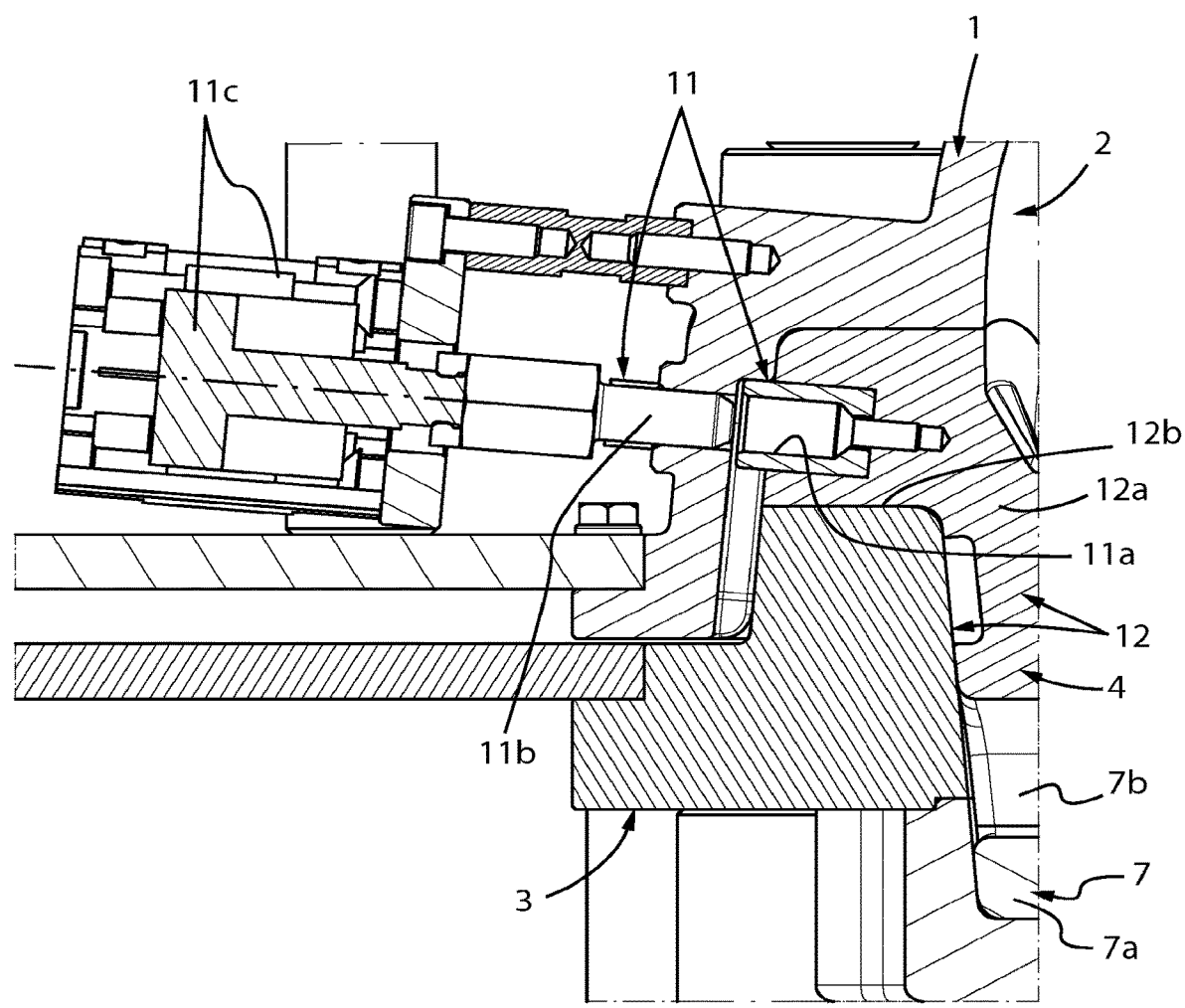
FIGS. 11 and 12 are sections of the intermediate support element referred to in FIGS. 1 and 3 to 10, carried out along the longitudinal development of a corresponding locking protuberance of the intermediate support element, in a rest position and in a locking position, respectively.
Figure 12:
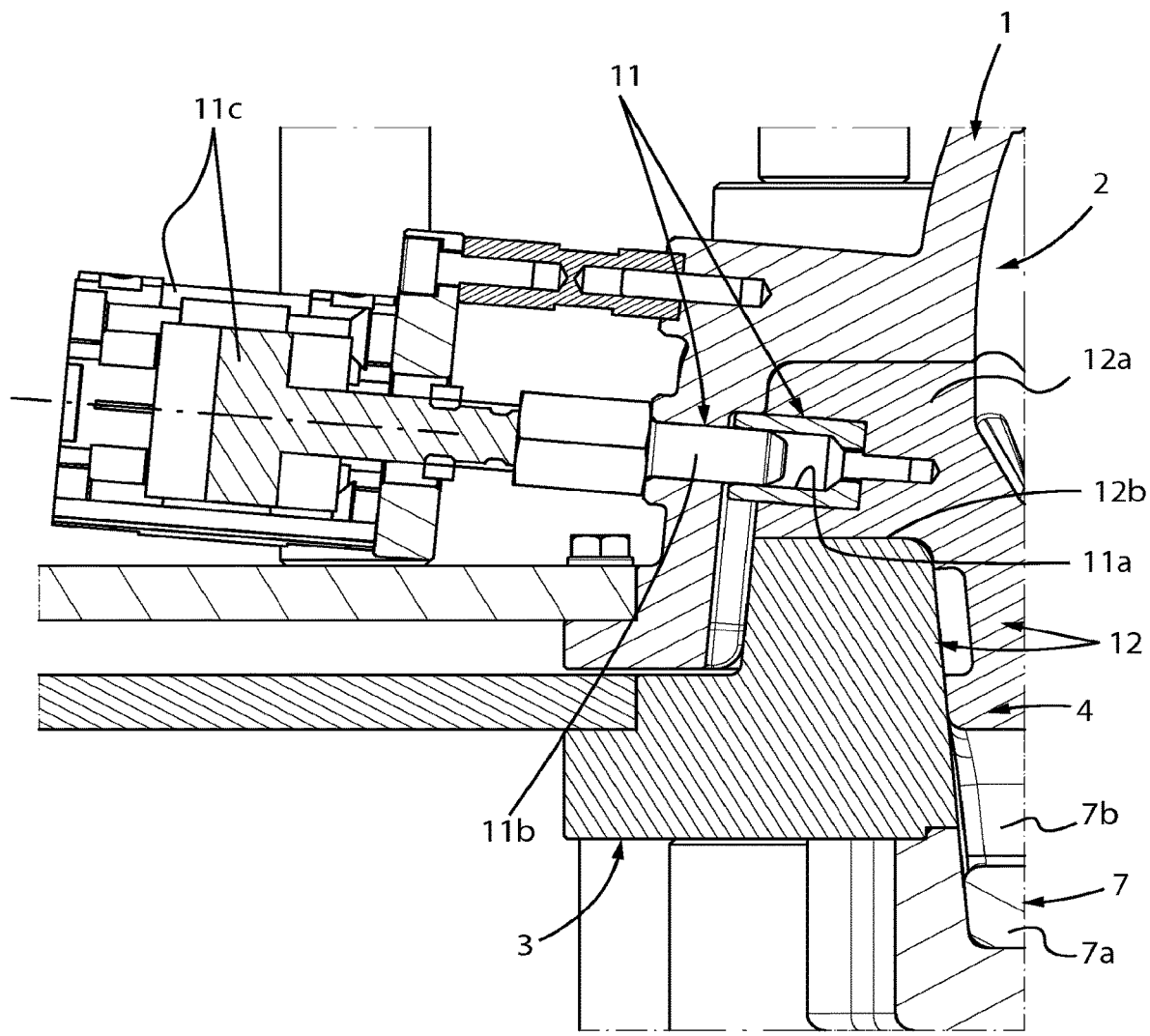

As can be seen in FIGS. 1, 11 and 12, the locking protuberances 11b of each molding concavity 2 are operationally located in correspondence with peripheral areas of the respective molding concavity 2, whereby the movement of these locking protuberances 11b from the rest position to the locking position causes a displacement of the same towards the central part of the respective molding concavity 2, that is towards one another. On the contrary, when the locking protuberances 11b of each molding concavity 2 are moved from the locking position to the unlocking position, they move away from the central part of the respective molding concavity 2, moving away from each other.

Advantageously, the locking protuberances 11b of each molding concavity 2 can be controlled by means of an actuation device (not visible in the attached figures) located outside the mold. Preferably, the actuation device of the locking protuberances 11b of each molding concavity 2 comprises at least one drive pedal. Even more preferably, the actuation device may comprise two or more drive pedals for the independent control of each pair of locking protuberances 11b of each molding concavity 2 or jointly control of all the locking protuberances 11b of the molding concavities 2 of the mold frame 1.

As can be seen in FIGS. 11 and 12, the actuation device of the locking protuberances 11b of each molding concavity 2 of the mold frame 1, activates these locking protuberances 11b by means of corresponding fluid-dynamic actuators 11c (FIGS. 2, 11 and 12) operationally located on the mold frame 1.

Advantageously, the mold comprises at least one engagement constraint 12 (FIGS. 1 and 3 to 12) for the stable coupling of each intermediate support member 4 to the corresponding counter frame 3. Each engagement constraint 12 is operationally interposed between the respective intermediate support element 4 and the counter frame 3.

In detail, each engagement constraint 12 comprises at least one coupling lug 12a, preferably two opposite coupling lugs 12a, and at least one coupling seat 12b, preferably two opposite coupling seats 12b, operatively interposed between the respective intermediate support element 4 and the corresponding counter frame 3.

Preferably, each coupling lug 12a of each engagement constraint 12 protrudes externally from the annular structure 8 of the respective intermediate support element 4 and each coupling seat 12b of each engagement constraint 12 is realized on the respective counter frame 3.

Preferably, each coupling lug 12a and the respective coupling seat 12b of each engagement constraint 12 are at least partly countershaped to ensure a stable coupling between the respective intermediate support element 4 and the corresponding counter frame 3.

According to a preferred aspect of the present invention, each locking seat 11a of the locking member 11 is externally realized on a respective coupling lug 12a of a respective engagement constraint 12.

Advantageously, the mold further comprises, for each molding concavity 2 of the frame 1, at least one auxiliary support element identical to the respective intermediate support element 4. Each auxiliary support element is usable to prepare one or more components B of a sporting helmet A which still has to be manufactured while the respective intermediate support element 4 is engaged in the respective molding concavity 2 during a respective molding cycle of the mold.

In other words, while each intermediate support element occupies the respective molding concavity 2 during the relative molding cycle of the corresponding sporting helmet A, each auxiliary support element is set up and prepared with respective components B of the sporting helmet to be manufactured subsequently, to be inserted into the respective molding concavity 2 as soon as the latter is freed from the corresponding intermediate support element 4.

The present invention also relates to a process for molding sporting helmets A, in particular cycling helmets, which will be described below.

The molding process comprises a step of providing the above-described frame 1 of the mold with the respective molding concavities 2 for molding the respective sporting helmets A and a step of preparing the respective counter frames 3 of the same mold designed to hermetically close the respective molding concavities 2 and allow the execution of the respective molding cycles.

The process further comprises a step of preparing the respective intermediate support elements 4 of the mold for supporting and positioning the components B of the sporting helmets A to be manufactured inside the respective molding concavities 2 of the frame 1 of the mold.

Following the provision of the frame 1, the respective counter frames 3 and the respective intermediate support elements 4, the molding process comprises a step of placing one or more components B of the sporting helmets A to be manufactured in the first portion 5 of each intermediate support element 4 (FIGS. 5 and 6) according to respective predetermined positions.

In detail, this step of placing is performed by accessing a series of seats 9 and/or reliefs 10 inside the annular structure 8 of each intermediate support element 4 through the respective first portion 5 thereof.

In order to be able to easily access the first portion 5 of each intermediate support element 4 and fix the components B of the respective sporting helmets A to be manufactured in correspondence with the respective support seats 9 and/or reliefs 10, said first portion 5 is to be kept facing upwards or towards the Figure of the operator who is carrying out the action of placing the components B.

More specifically, the placing of the components B of the sporting helmets A to be manufactured is carried out by resting the second portion 6 of each intermediate support element 4 on a work plane or a similar support plane in such a way that the first portion 5 of this intermediate support element 4 is easily reachable by the hands of the operator who has to position the components B of the sporting helmet A to be made in the corresponding support seats 9 and/or on the corresponding support reliefs 10 of these intermediate support elements 4.

Figure 7:
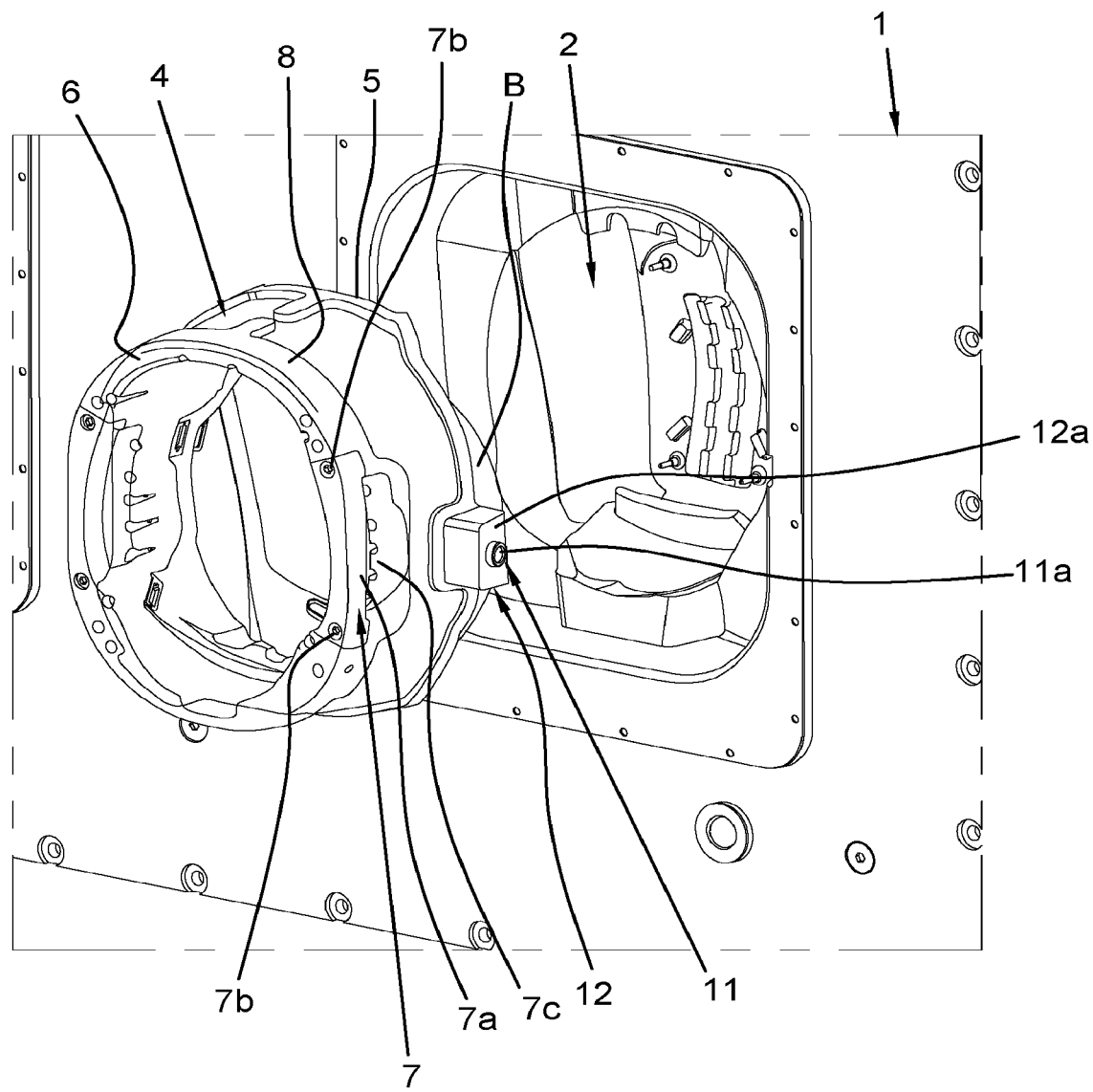
FIG. 7 is a schematic perspective representation of the insertion of the intermediate support element referred to in FIGS. 1 and 3 to 6, provided with some components of the sporting helmet to be manufactured, into a respective molding concavity of the mold frame referred to in FIGS. 1 and 2.

Once the step of placing the components B of the sporting helmets A to be manufactured in the corresponding support seats 9 and/or on the corresponding support reliefs 10 of the respective intermediate support elements 4 is completed, the molding process comprises the step of positioning each intermediate support element 4 inside the corresponding molding concavity 2 of the mold frame 1 (FIG. 7).

This step is performed by first orienting the first portion 5 of each intermediate support element 4 towards the respective molding concavity 2, then inserting said intermediate support element 4 into the respective molding concavity 2 in such a way as to place the components B of the respective sporting helmet A to be manufactured inside the latter according to corresponding predetermined positions.

The step of positioning each intermediate support element 4 in the respective molding concavity 2 with the respective components B of the corresponding sporting helmet A to be manufactured is performed manually by an operator, preferably by grasping the gripping portion 7a of each grip handle 7 defined in correspondence with the second portion 6 of each intermediate support element 4.

Preferably, the step of positioning each intermediate support element 4 in the respective molding concavity 2 is performed by inserting this intermediate support element 4 in the corresponding molding concavity 2 along a direction substantially orthogonal with respect to a main lying plane X (FIGS. 1 and 2) of the frame 1 of the mold.

When each intermediate support element 4 is positioned inside the corresponding molding concavity 2, each intermediate support element 4 is locked in the respective molding concavity 2 to avoid unwanted displacements and fix the predetermined position for the components B of the respective sporting helmet A to be manufactured.

As can be seen in FIG. 12, the step of locking each intermediate support element 4 in the respective molding concavity 2 of the frame 1 of the mold is carried out by the interaction between the movable locking protuberances 11b inside the respective concavity 2 and the respective locking seats 11a realized externally on the respective intermediate support element 4.

The step of locking each intermediate support element 4 in the respective molding concavity 2 of the frame 1 of the mold is carried out by activating the respective locking protuberances 11b from the rest position (FIGS. 1 and 11) wherein the respective intermediate support element 4 can be inserted into the corresponding molding concavity 2 or removed therefrom to the locking position (FIG. 12) wherein the respective locking protuberances 11b engage the respective locking seats 11a of the corresponding intermediate support element 4, holding the latter inside the respective molding concavity 2 of the mold frame 1.

The locking step is advantageously carried out by movement operating the locking protuberance 11b by operating a control device located externally to the mold, preferably at least one control pedal.

The locking of each intermediate support element 4 in the respective molding concavity 2 can be activated independently by operating a respective dedicated control pedal or simultaneously on all the molding concavities 2 of the frame 1 of the mold by means of a suitable general control pedal.

Once the locking is finished, the molding process provides for the subsequent step of engaging each counter frame 3 of the mold to the frame 1 thereof in order to hermetically close the respective molding concavity 2 at the second portion 6 of the respective intermediate support element 4 facing outwards from the respective molding concavity 2.

The step of engaging each counter frame 3 of the mold to the frame 1 thereof is also carried out by engaging the aforementioned coupling lugs 12a which protrude externally from each intermediate support element 4 in the respective coupling seats 12b realized on the corresponding counter frames 3 of the mold.

Once each molding concavity 2 of the mold frame 1 has been closed, a respective known molding cycle is started by injecting a corresponding molding material, preferably polystyrene.

When the molding cycle has reached its end, the molding process comprises the subsequent step of disengaging each counter frame 3 of the mold from the frame 1 of the same in order to access the respective molding concavity 3 and the corresponding intermediate support element 4 contained therein.

The step of disengaging each counter frame 3 of the mold from the frame 1 of the same is also carried out by disengaging the respective coupling lugs 12a which protrude externally from the respective intermediate support elements 4 from the respective coupling seats 12b realized on the respective counter frames 3 of the mold.

Each intermediate support element 4 is then released from the respective molding concavity 2, again by the interaction between the respective locking protuberances 11b that are movable inside the corresponding molding concavity 2 and the respective locking seats 11a realized externally on each intermediate support element 4.

In particular, the unlocking step is carried out by movement operating the respective locking protuberances 11b of each molding concavity 2 from the locking position (FIG. 12) to the rest position (FIGS. 1 and 11). In this way each intermediate support element is freed so that it can be removed from the respective molding concavity 2.

Similarly to the locking step, the unlocking step is also carried out by operating at least one control device, preferably at least one drive and control pedal operatively connected to the respective locking protuberances 11b.

Once each support element 4 has been released, it can be removed from the respective molding concavity 2 of the mold frame 1 together with the corresponding formed sporting helmet A (FIG. 9).

The removal step is also carried out manually by an operator grasping the gripping portions 7a of the corresponding grip handles 7 of the respective intermediate support element 4 defined at the second portion 6 of the latter.

The step of removing each intermediate support element 4 together with the respective sporting helmet manufactured by the respective molding concavity 2 is carried out by extracting said intermediate support element 4 along a direction substantially orthogonal to the main lying plane X of the mold frame 1.

Subsequently, the molding process provides for a step of separating each intermediate support element 4 from the corresponding sporting helmet A manufactured (FIG. 10), to allow the entire molding process to be repeated.

Advantageously, the above-described molding process may further comprise the use of an auxiliary support element (not illustrated in the attached figures) identical to the intermediate support element 4 for each molding concavity 2 of the mold frame 1.

The auxiliary support element is advantageously set up with the components B of the sporting helmets A to be manufactured, while the corresponding intermediate support elements 4 are located inside the corresponding molding concavities 2 during a corresponding molding cycle.

When the intermediate support elements 4 are removed from the corresponding molding concavities 2 at the end of the molding cycle, the corresponding auxiliary support elements are immediately inserted into the corresponding molding concavities 2 to initiate a subsequent molding cycle, thus minimising the interruptions in the production cycle of sporting helmets A.

Since the auxiliary support elements are identical to the intermediate support elements 4, the process steps that are carried out on the intermediate support elements 4 are also carried out in a similar manner on the auxiliary support elements. While the intermediate support elements 4 are arranged inside the respective molding concavities 2 of the mold frame 1 during a corresponding molding cycle, the operators prepare the auxiliary support elements with the corresponding components B of the sporting helmets to be manufactured. Conversely, when the auxiliary support elements 4 are arranged inside the respective molding concavities 2 of the mold frame 1 during a corresponding molding cycle, the operators prepare the auxiliary support elements with the corresponding components B of the sporting helmets to be manufactured.

The alternation of the intermediate support elements 4 with the auxiliary support elements ensures the continuity of the molding cycles of the sporting helmets being manufactured, thus considerably increasing the number of helmets produced in a unit of time.

The mold and the relative molding process described above solve the problems encountered with the prior arte and allow important advantages to be achieved.

In detail, the elimination of the step of removing the traditional support template before starting the molding cycle from the respective molding concavity has allowed, on the one hand, speeding up the molding process with significant reductions in the overall production times of the sporting helmets and, on the other hand, to ensure the maintenance of the positions of the components of the sporting helmets to be manufactured before the hermetic closure of the mold and during the execution of each molding cycle.

It should therefore be noted that keeping the intermediate support elements in the respective molding concavities of the mold frame allows an overall reduction of the process for molding each sporting helmet being manufactured.

In addition, keeping the intermediate support elements in the respective molding concavities of the mold frame ensures that the positions assigned to each component of the sporting helmet being manufactured are maintained before the mold is closed and throughout the entire molding cycle, so that the quality of the obtained sporting helmet is excellent and the mold is structurally preserved.

The invention claimed is:

1. A mold for the manufacture of sporting helmets, the mold comprising:
   at least one frame defining at least one molding concavity, for molding at least one respective sporting helmet;
   at least one counter frame engageable to the frame to hermetically close the respective molding concavity and allow an execution of at least one molding cycle;
   wherein the mold comprises at least one intermediate support element for supporting and positioning one or more components of the sporting helmet to be made inside the respective molding concavity of the frame, the intermediate support element having:
      a first portion arranged to receive in engagement one or more components of the sporting helmet to be manufactured according to respective predetermined positions;
      a second portion facing away from the first portion and having at least one grip handle, for manual positioning of the intermediate support element in the respective molding concavity of the frame and a consequent positioning of the components of the sporting helmet to be manufactured inside said molding concavity, the second portion of the intermediate support element being arranged to be coupled to the respective counter frame;
   at least one engagement member for a stable coupling of the intermediate support element to the frame inside the respective molding concavity, the engagement member being operatively interposed between the intermediate support element and the respective molding concavity of the frame;
   at least one engagement constraint for the stable coupling of the intermediate support element to the counter frame, the engagement constraint being operationally interposed between the intermediate support element and the counter frame.

2. The mold according to claim 1, wherein the intermediate support element comprises a substantially annular structure having internally at least one seat and/or one relief for supporting at least one component of the sporting helmet to be manufactured, the support seat and/or relief being accessible from the first portion.

3. The mold according to claim 2, wherein the engagement member comprises:
   at least one locking seat, realized outside the annular structure of the intermediate support element;
   at least one locking protuberance, movable within the respective molding concavity of the frame between a rest position wherein the intermediate support element can be inserted into the molding concavity or removed therefrom and a locking position wherein the locking protuberance engages the respective locking seat of the intermediate support element to hold the latter inside the respective molding concavity of the frame.

4. The mold according to claim 3, wherein the locking protuberance can be controlled with an actuation device located outside the mold.

5. The mold according to claim 2, wherein the engagement constraint comprises at least one coupling lug and at least one coupling seat operatively interposed between the intermediate support element and the counter frame.

6. The mold according to claim 5, wherein the engagement constraint comprises:
   at least one coupling lug, protruding externally from the annular structure of the intermediate support element;
   at least one coupling seat, realized on the counter frame, the coupling lug and the respective coupling seat being at least partly countershaped to ensure a stable coupling between the intermediate support element and the respective counter frame.

7. The mold according to claim 6, wherein the locking seat of the locking member is externally realized on a respective coupling lug of the engagement constraint.

8. The mold according to claim 2, wherein the grip handle is defined by the annular structure of the intermediate support element.

9. The mold according to claim 2, wherein the grip handle includes a gripping portion defined by a block engaged to the annular structure of the intermediate support element, the gripping portion being designed to be manually gripped by an operator.

10. The mold according to claim 2, wherein the grip handle includes a gripping opening defined between the annular structure of the intermediate support element and the gripping portion of the gripping handle to allow the insertion of a hand of an operator when he has to grasp said handle.

11. The mold according to claim 1, wherein the mold comprises at least one auxiliary support element identical to the intermediate support element, the auxiliary support element being usable to prepare one or more components of a sporting helmet to be molded while the intermediate support element is engaged in the respective molding concavity of the frame of the mold during a relative molding cycle.

12. The process according to claim 10, further comprising the steps of:
    preparing at least one auxiliary support element identical to the intermediate support element;
    positioning one or more components of the sporting helmet to be manufactured on a first portion of the auxiliary support element according to respective predetermined positions, during a molding cycle wherein the intermediate support element is located within the respective molding concavity of the mold frame;
    positioning the auxiliary support element within the respective molding concavity of the mold frame with the first portion facing said molding concavity to position the components of the sporting helmet to be manufactured in the respective molding concavity according to respective predetermined positions, after the removal of the intermediate support element from said molding concavity of the frame of the mold;
    blocking the auxiliary support element inside the respective molding concavity;
    engaging the counter frame of the mold on the frame of the same to hermetically close the respective molding concavity at a second portion of the auxiliary support element opposite with respect to the first portion;
    starting a molding cycle by injecting a corresponding molding material.

13. The process according to claim 12, wherein the steps of:
    separating the intermediate support element from the respective manufactured sporting helmet; and,
    positioning one or more components of a subsequent sporting helmet to be manufactured in the first portion of the intermediate support element according to respective predetermined positions for a new molding cycle to be carried out, are carried out while the auxiliary support element is located within the respective molding concavity during the respective molding cycle.

14. A process for molding sporting helmets, in particular cycling helmets, comprising the steps of:
    providing at least one frame of a mold defining at least one molding concavity, for molding at least one respective sporting helmet;
    preparing at least one counter frame of the mold engageable to the frame to hermetically close the respective molding concavity and allowing an execution of at least one molding cycle;
    preparing at least an intermediate support element for supporting and positioning one or more components of the sporting helmet to be manufactured inside the respective molding concavity of the frame of the mold;
    placing one or more components of the sporting helmet to be manufactured in a first portion of the intermediate support element according to respective predetermined positions;
    positioning the intermediate support element inside the respective molding concavity of the mold frame with the first portion facing said molding concavity to position the components of the sporting helmet to be manufactured in the respective molding concavity according to respective predetermined positions;
    blocking the intermediate support element inside the respective molding concavity according to the previously determined position;
    engaging the counter frame of the mold to the frame of the same to hermetically close the respective molding concavity in correspondence with a second portion of the intermediate support element opposite the first portion;
    starting a molding cycle by injecting a corresponding molding material;
    disengaging the counter frame of the mold from the frame of the same to access the respective molding concavity and the respective intermediate support element, when the molding cycle is completed;
    releasing the intermediate support element from the respective molding concavity;
    removing the intermediate support element from the respective molding concavity of the frame of the mold together with the respective manufactured sporting helmet;
    separating the intermediate support element from the respective manufactured sporting helmet;
    repeating the process again.

15. The method according to claim 14, wherein the step of positioning the intermediate support element in the respective molding concavity and the step of removing the intermediate support element together with the respective sporting helmet manufactured by the respective molding concavity are carried out manually, by gripping at least one grip handle defined in correspondence with the second portion of the intermediate support element.

16. The process according to claim 15, wherein;
    the step of positioning the intermediate support element in the respective molding concavity is carried out by inserting said intermediate support element in the respective molding concavity along a direction substantially orthogonal with respect to a main lying plane of the frame of the mold;
    the step of removing the intermediate support element together with the respective sporting helmet manufactured by the respective molding concavity is carried out by extracting said intermediate support element along a direction substantially orthogonal to the main lying plane of the mold frame.

17. The process according to claim 14, wherein a step of locking the intermediate support element inside the respective molding concavity of the mold frame and a step of unlocking of the intermediate support element from the respective molding concavity of the mold frame are carried out by an interaction between at least one movable locking protuberance, arranged in the molding concavity, and at least one locking seat realized externally on the intermediate support element.

18. The process according to claim 17, wherein:
the step of locking the intermediate support element in the respective molding concavity of the frame of the mold is carried out by activating the locking protuberance from a rest position wherein the element support intermediate can be inserted into the molding concavity or removed therefrom and a locking position wherein the locking protuberance engages the respective locking seat of the intermediate support element holding the latter inside the respective molding concavity of the mold frame;
the step of unlocking the intermediate support element from the respective molding concavity is carried out by moving the locking protuberance from the locking position to the rest position.

19. The process according to claim 18, wherein the locking step and the unlocking step are carried out by movement operating the locking protuberance by operating a control device located externally to the mold by operating of a control pedal.

20. The process according to claim 14, wherein:
the step of engaging the counter frame of the mold to the frame of the same is also carried out by engaging at least one coupling lug externally projecting from the intermediate support element in at least one coupling seat realized on the counter frame of the mold;
the step of disengaging the counter frame of the mold from the frame of the same is also performed by disengaging the coupling lug protruding externally from the intermediate support element from the respective coupling seat realized on the counter frame of the mold.

* * * * *